July 9, 1963
H. A. EICHACKER ETAL
3,097,007
PANIC EXIT DEVICE
Filed Sept. 10, 1959
4 Sheets-Sheet 1
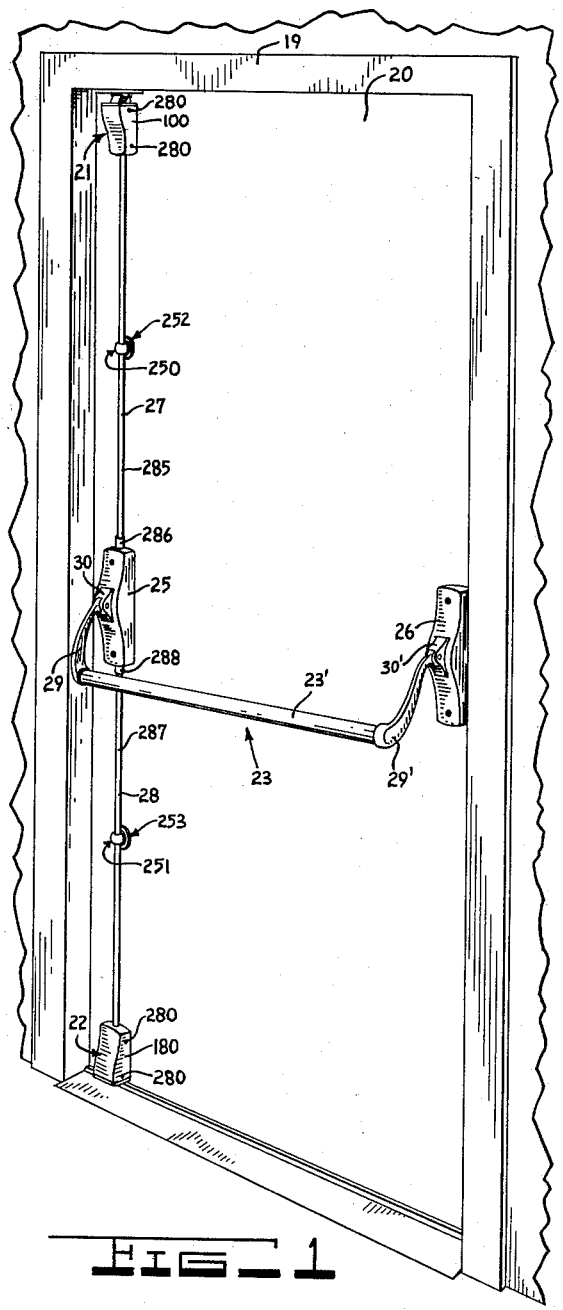
FIG_1
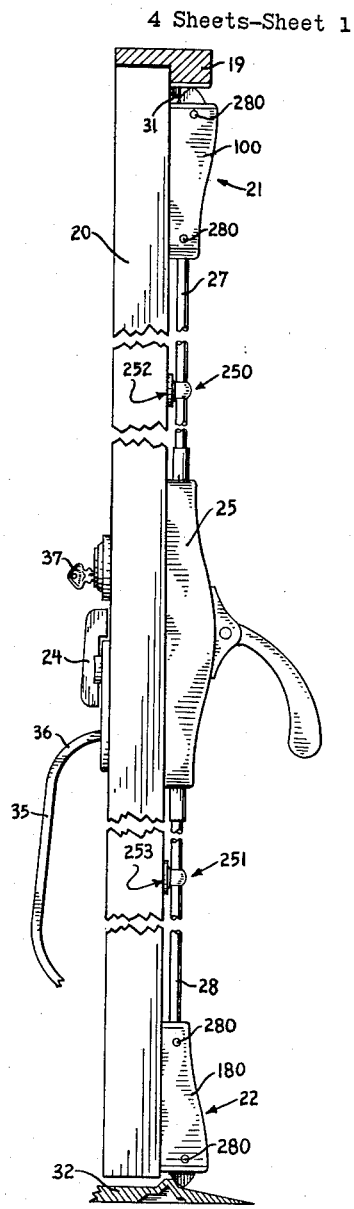
FIG_2
INVENTOR.
HOMER A. EICHACKER
BY and JOHN R. FOSTER
Harold B. Hood
ATTORNEY July 9, 1963

H. A. EICHACKER ETAL 3,097,007

PANIC EXIT DEVICE

Filed Sept. 10, 1959

INVENTOR.
HOMER A. EICHACKER
BY and JOHN R. FOSTER

Harold B. Hood

ATTORNEY

July 9, 1963

H. A. EICHACKER ETAL 3,097,007

PANIC EXIT DEVICE

Filed Sept. 10, 1959

INVENTOR.
HOMER A. EICHACKER
and JOHN R. FOSTER
BY
*Harold B. Hood*
ATTORNEY

July 9, 1963

H. A. EICHACKER ETAL 3,097,007

PANIC EXIT DEVICE

Filed Sept. 10, 1959

INVENTOR.
HOMER A. EICHACKER
and JOHN R. FOSTER
BY
Harold B. Hood
ATTORNEY

United States Patent Office 3,097,007
Patented July 9, 1963

3,097,007
PANIC EXIT DEVICE
Homer A. Eichacker and John R. Foster, Indianapolis, Ind., assignors to Vonnegut Hardware Company, Indianapolis, Ind., a corporation of Indiana
Filed Sept. 10, 1959, Ser. No. 839,105
4 Claims. (Cl. 292—92)

The present invention relates to a panic exit device and to certain subcombinations thereof.

It is an object of the present invention to provide an improved panic exit device.

Another object of the present invention is to provide a panic exit device which will be automatically released by a relatively small force and relatively slight movement applied to the panic bar thereof even though people within a building are crowding against the door, upon which the panic exit device is mounted, with relatively great force.

A further object of the present invention is to provide a panic exit device, including a first latch bolt adapted for mounting near the top of the door and a second latch bolt adapted for mounting near the bottom of the door, said panic exit device being constructed in such a manner that the second latch bolt may be prevented from moving toward projected position without preventing the first latch bolt from moving to projecting position, yet in such a manner that both latch bolts are released simultaneously upon actuation of the panic bar mechanism to allow opening of the door.

Another object of the present invention is to provide an improved means for projecting a lower latch bolt into door-retaining position so as to overpower a certain amount of resisting force of dirt or other material in the path of the latch bolt.

Still another object of the present invention is to provide an improved latch mechanism adapted to be mounted on that surface of the door which faces away from door-opening movement, which latch mechanism includes a latch bolt mounted to pivot away from the door in moving from a projected to a retracted position.

Yet another object is to provide a latching mechanism including simple means for holding the latch bolt thereof toward retracted position while the door is open and for releasing the latch bolt to be projected when the door is closed.

In panic exit devices which include an upper latch mechanism adapted to be mounted near the top of a door, a lower latch mechanism adapted to be mounted near the bottom of the door and a panic bar mechanism adapted to be mounted on the door between the two latch mechanisms, means adapted to be mounted on the door between the upper latch mechanism and the panic bar mechanism and between the lower latch mechanism and the panic bar mechanism are provided for guiding the rods operatively connecting the panic bar mechanism with the upper and lower latch mechanisms. It is desirable that such guide means be attached to the door in a concealed or not-outwardly-visible manner not only for aesthetic purposes but also to mislead vandals who might otherwise attempt to tamper with or remove portions of the panic exit device from the door. It is also desirable that such guide means as well as the associated means for attaching the guide means to the door be relatively small in size.

It is therefore a further object of the present invention to provide an improved, vandal-misleading means for attaching a rod guide to a door.

Another object of the present invention is to provide a concealed or not-outwardly-visible means for attaching a rod guide of a panic exit device to a door.

Still a further object of the present invention is to provide a means for attaching a rod guide to a door which is so designed that it will accomplish its purpose even though it is made relatively small.

Still further objects of the invention will appear as the description proceeds.

To the accomplishment of the above and related objects, our invention may be embodied in the forms illustrated in the accompanying drawings, attention being called to the fact, however, that the drawings are illustrative only, and that changes may be made in the specific constructions illustrated and described, so long as the scope of the appended claims is not violated.

FIG. 1 is a perspective view of a door equipped with a panic exit device constructed in accordance with the present invention;

FIG. 2 is an elevation, drawn to a somewhat enlarged scale and having certain portions thereof broken away, of the free edge of the door of FIG. 1, showing the panic exit device in door-retaining association with a threshold and a strike;

Figure 3:
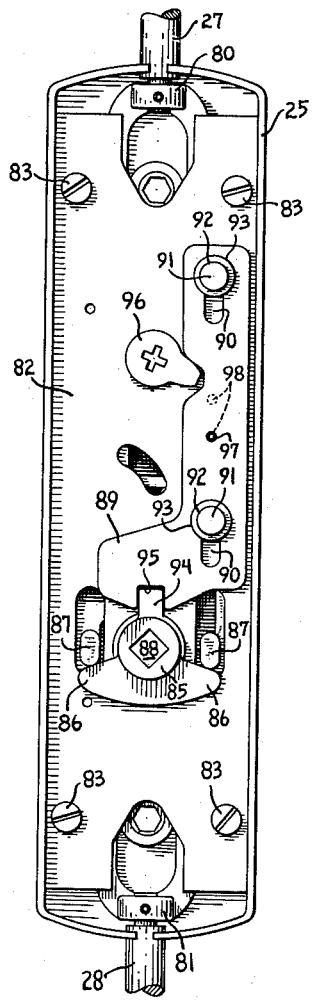
FIG. 3 is an enlarged rear elevation of a center case forming a portion of the panic exit device of FIG. 1, showing mechanism received within the case.

Referring now to the drawings, and more particularly to FIGS. 1 and 2, it will be seen that we have shown a door 20 conventionally mounted within a door frame 19 and having a panic exit device embodying the present invention mounted thereon. The panic exit device comprises an upper latch mechanism 21 shown mounted on the door near the top of that surface of the door which faces away from the direction of door-opening movement, a lower latch mechanism 22 shown mounted on the same surface and a panic bar mechanism, indicated generally by the numeral 23 and shown mounted on the same surface of the door 20. A panic bar 23′ or a pivotally mounted thumb-piece 24 may be actuated so as to release the latch mechanisms 21 and 22 by acting through mechanism contained within a center case 25 and through an upper rod 27 and a lower rod 28 which operatively connect the mechanism within the center case 25 with the upper latch mechanism 21 and the lower latch mechanism 22, respectively. The panic bar 23 is mounted for limited oscillation upon the case 25 and upon a case 26 by means of a pair of panic bar levers 29 and 29' and by means of brackets 30 and 30' fixed to the case 25 and the case 26, respectively, the cases 25 and 26 being fixed to the door 20.

The door is maintained in the closed position depicted in FIGS. 1 and 2 by the latch mechanisms 21 and 22 respectively engaging a roller strike 31 fixed to and depending from the frame 19 and engaging a threshold plate 32 fixed to the floor below the door 20. A handle 35 is fixed to the door upon that surface thereof which faces toward the direction of door-opening movement by means of the handle's upper end 36 and its lower end (not shown) so that a person located on the other side of the door from the panic exit device may open the door by rotating the thumbpiece and, if necessary, a key 37 and by pulling the door toward himself by means of the handle 35.

Figure 4:
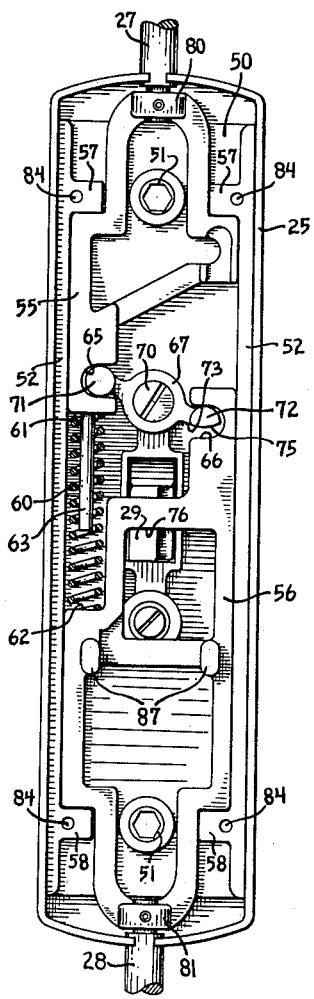
FIG. 4 is a view similar to FIG. 3 in which certain portions of the mechanism within the case have been removed to show certain other mechanisms within the case.
Figure 5:
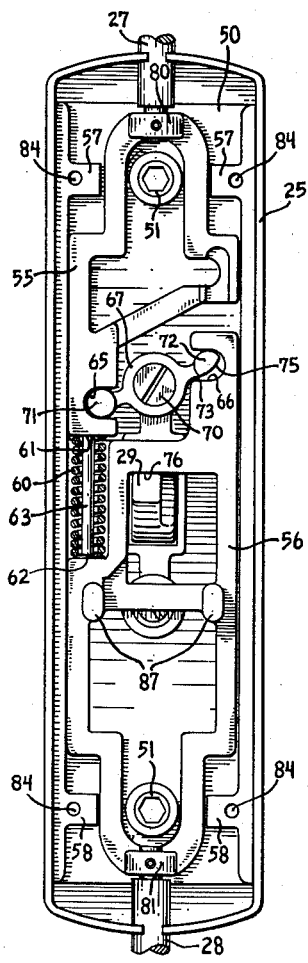
FIG. 5 is a view similar to FIG. 4 showing the mechanism within the case in a different operating position than FIG. 4, namely, in a position to which the mechanism is moved when the panic bar of the panic exit device is actuated or completely depressed to retract the latch bolts of the panic exit device.

Referring now to FIGS. 3, 4 and 5, the mechanism within the case 25 is shown in detail. That mechanism comprises a chassis 50 fixed within the case 25 by hollow screws 51—51 (hollow to provide apertures for screws for attaching the case to the door) and provided with a pair of projecting parallel sides 52—52 between which an upper rod actuator 55 and a lower rod actuator 56 are slidably received for vertical reciprocation within the center case 25. The upper rod actuator 55 and the lower rod actuator 56 are yieldably held in upward and downward positions, respectively, abutting projecting portions 57—57 and 58—58 of the sides 52, by means of a compression spring 60 received between mutually facing abutment surfaces 61 and 62 of the actuators 55 and 56, respectively. The spring 60 is retained between the surfaces 61 and 62 by a finger 63, which is integral with and projects from the upper actuator 55 and about which the spring is received. If desired, suitable means may be provided for retaining the lower end of the spring 60 in abutting association with the abutment surface 62 although such means are not shown in the present embodiment.

Each of the rod actuators 55 and 56 is formed with a part-cylindrical cavity 65 or 66, which are laterally spaced and open toward one another. An actuator lever 67 is mounted for oscillation about a screw 70 threadedly fixed to the chassis 50 and has two equally, oppositely projecting, generally horizontal arms 71 and 72 each having its distal end received within one of the cavities 65 and 66. The distal end of the arm 71 has the same cylindrical shape as the cavity 65 within which it is received; but the distal end of the arm 72 has a part-cylindrical shape with its downwardly facing surface 75 flattened to a slightly convex shape whereby, when the lower actuator 56 moves upwardly from the position of FIG. 4, there is no corresponding oscillatory movement of the lever 67 or downward movement of the upper actuator 55 until the lower surface of the cavity 66 engages the surface 75 of the arm 72.

The lever 67 and cavities 65 and 66 are so shaped, however, that, if upward movement of the lower actuator 56 is continued until the parts are in the position illustrated in FIG. 5, the total downward movement of the upper actuator is substantially equal to the total upward movement of the lower actuator 56. This is true because, when the parts are in the position of FIG. 5, the leftward edge 73 of the downwardly facing surface 75 is in contact with the cavity 66. Since this leftward edge is located at substantially the same place it would have been were the cylindrical shape of the arm 72 not flattened, the parts (in the position of FIG. 5) are in substantially the same position they would be in if the distal end of the arm 72 had the same cylindrical shape as the distal end of the arm 71.

The panic bar lever 29 (FIGS. 1, 2 and 4) extends into the case 25 just below and engaging a downwardly facing surface 76 of the lower actuator 56. The upper actuator 55 and the lower actuator 56 are connected for positive vertical reciprocation with the upper rod 27 and the lower rod 28 by head-and-socket-type-joints 80 and 81, respectively. Thus, when the panic bar 23' is actuated or depressed to move the mechanism from the position shown in FIG. 4 to the position shown in FIG. 5, the total downward movement of the upper actuator 55 and rod 27 is substantially equal to the total upward movement of the lower actuator 56 and rod 28 even though the lost-motion caused by the part-cylindrical shape of the distal end of the arm 72 initially allows movement of the lower rod 28 and actuator 56 without corresponding movement of the upper rod 27 and actuator 55. The equal total movement of the upper and lower rods 27 and 28 is desirable because the latch mechanisms 21 and 22 can then be similar in design, shape and size. The purpose of the lost-motion between the arm 72 and actuator 56 will be explained below.

Referring now more particularly to FIG. 3, it will be seen that a plate 82 largely covers the mechanism shown in FIGS. 4 and 5, said plate being fixed to the chassis 50 by means of screws 83—83, which are received within threaded bores 84—84 in the chassis 50. A pivotal member 85 is pivotally mounted upon the plate 82 and is provided with oppositely projecting arms 86—86. By pivoting the thumb-piece 24 which is positively connected to the pivotal member 85 by means of a connecting member (not shown) which is received in a square shaped, axial aperture 88 in the pivotal member 85, the pivotal member 85 may be pivoted to cause either of the arms 86 to force against one of a pair of projections 87—87 integral with the actuator 56 to raise the actuator. The pivotal member 85 and, as a result, the thumb-piece 24 may be locked to prevent the pivoting thereof by the key 37 acting through a blocker slide 89 shown in FIG. 3 in locking position.

The blocker slide 89 is provided with slots 90—90 through which pass mounting members 91—91 having enlarged heads 92—92 and fixed within suitable bores in the plate 82 for reciprocably mounting the slide 89 upon the plate 82. About the members 91 and between the heads 92 and the slide 89 are received spring washers 93—93 which resiliently urge the slide 89 against the plate 82. The pivotal member 85 has an arm 94 projecting radially therefrom and the slide 89 has an indentation 95 within which the arm 94 is received when locking the pivotal member 85 as in FIG. 3.

The slide 89 may be reciprocated by the key 37 acting through a cam member 96 between the locking position of FIG. 3 and a non-blocking position in which the slide is out of the path of the arm 94. The slide is dimpled at 97 so as to produce a protuberance on the side of the slide in slidable contact with the plate 82. A pair of apertures 98—98 are so located in the plate 82 that, when the blocking slide is in the blocking position, the protuberance protrudes into one of the apertures 98 whereby said spring washers 93 yieldably hold the blocker slide in blocking position and, when said blocking slide is in its non-blocking position, the protuberance protrudes into the other of the apertures 98 whereby the spring washers yieldably hold the blocking slide in the non-blocking position. Such an arrangement prevents the slide from moving to an intermediate position between the blocking and non-blocking position when the slide is not engaged by the cam member 96 which condition would result in the inoperability of the cam member 96 and key 37.

Referring now to FIGS. 6 through 9, the upper latch mechanism 21 is shown with its housing 100 (FIG. 1)

removed and comprises an upper latch frame, indicated generally by the numeral 101, which is formed in two portions, a lower portion 103 and an upper portion 104 which are fixed to one another. The lower portion 103 is formed with a base wall 102 having laterally extending ears 105—105, formed in the plane of the base wall, said ears being suitably apertured for reception of a plurality of screws 106—106 for fixing the frame 101 to the surface of the door. The lower portion 103 of the frame is formed with parallel side walls 110 and 111 projecting outwardly from the base wall 102 and is open at its upper and lower ends, the upper portion 104 of the frame having a cut-out portion 112 so as to provide an open upper end for the upper latch frame 101.

Figure 7:
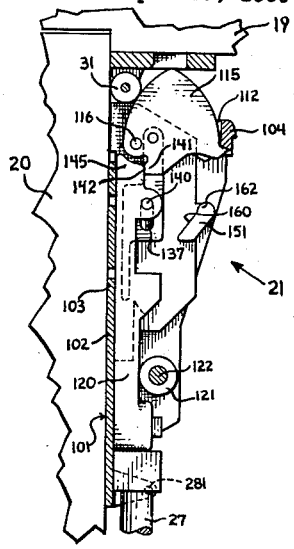
FIG. 7 is a section, taken along the line 7—7 of FIG. 6 and looking in the direction of the arrows.
Figure 6:
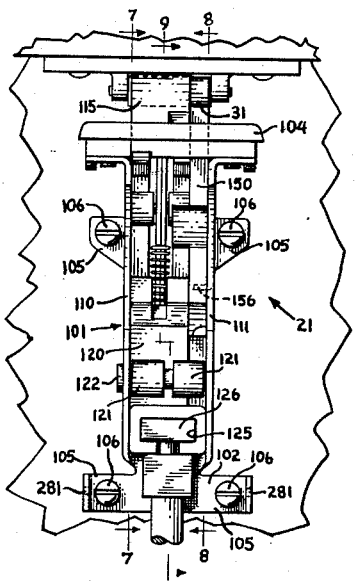
FIG. 6 is an enlarged elevation of the upper latch mechanism, with its cover removed, showing the latch mechanism in door-retaining association with the strike.
Figure 8:
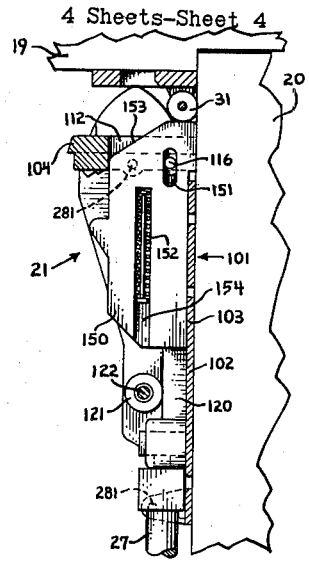
FIG. 8 is a section of the latch mechanism of FIG. 6 taken along the line 8—8 of FIG. 6 and in the direction of the arrows.
Figure 9:
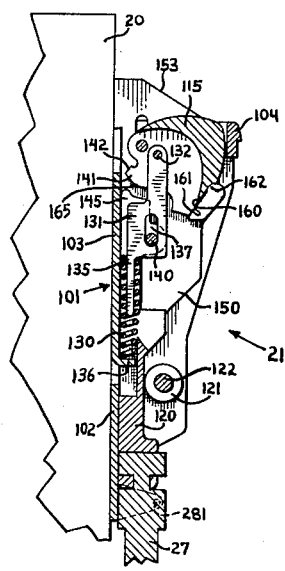
FIG. 9 is a section taken as if on the line 9—9 of FIG. 6 in the direction of the arrows but showing the latch mechanism with its latch bolt in a retracted, door-releasing position.

An upper latch bolt 115 is pivotally mounted upon the latch frame 101 near the upper end thereof adjacent the base wall 102 by means of a pin 116 received within suitable bores within the upper portion 104 of the latch frame. The latch bolt 115 is pivotal toward the door into a position, as shown in FIGS. 6, 7 and 8, wherein the bolt projects from the upper end of the latch frame and is pivotal away from the door into a position, as shown in FIG. 9, wherein the bolt is retracted within the latch frame. As can perhaps best be seen in FIG. 7, the further projection of the latch bolt 115 past the position of FIG. 7 is limited by the engagement of the latch bolt with the upper portion 104 of the latch frame.

An upper latch bolt actuator 120 is retained for vertical reciprocation between the side walls 110 and 111 of the latch frame by means of a pair of rollers 121—121 rotatably received upon a mounting pin 122 which is received within suitable apertures in the side walls 110 and 111 of the latch frame. The actuator 120 has a cavity 125 at its lower end within which is received a head 126 of the upper rod 27 in such a manner as to provide a positive connection between the actuator 120 and the rod 27 whereby the actuator may be moved downwardly by actuation of the panic bar 23 or may be resiliently held upwardly by the compression spring 60 acting through the upper rod actuator 55 and the upper rod 27.

The latch bolt 115 is resiliently held in the projecting position of FIGS. 6-8 by means of a compression spring 130 acting through a link 131, the link being pivotally secured to the latch bolt 115 by a pin 132 extending through the latch bolt at a point on the other side of the pin 116 in relation to the base wall 102. The base wall 102 is inwardly punched out to provide an abutment surface 136 against which the spring 130 acts, the spring 130 being retained in position by the abutment surface 136 and by a downwardly projecting arm 135 of the link 131 upon which arm the spring 130 is received.

The link 131 has a vertically arranged slot 137 through which passes a pin 140 received within suitable bores in the actuator 120. The latch bolt may be retracted into the latch frame by downward movement of the actuator 120 from the position of FIG. 7. As the actuator moves downwardly, the pin 140 moves in the slot 137 until the pin reaches the lower surface of the slot 137 at which time the link 131 begins to move downwardly, against the urging of the spring 130, pivoting the latch bolt 115 toward the position of FIG. 9.

A portion 141 of the latch bolt 115 having an abutment surface 142 is so arranged as to move toward the base wall 102 of the latch frame when the latch bolt moves from the projected position of FIG. 7 toward the retracted position of FIG. 9. Because of the lost-motion connection between the actuator 120 and the link 131, the upper end 145 of the actuator 120 is movable into and out of a position best shown in FIG. 7 wherein the upper end 145 of the actuator is between the base wall 102 and the abutment surface 142 whereby to block the movement of the abutment surface toward the base wall and thus to block the latch bolt 115 in a projected position. Assuming that the latch bolt 115 is free to move upwardly into the position of FIG. 7, the spring 130 will so move the latch bolt thus moving the abutment surface 141 away from the base wall 102 to the position of FIG. 7. When the latch bolt is in such a projected position, the actuator 120 may then be moved, by the spring 60 acting through the rod actuator 55 and the rod 27, upwardly with respect to the link 131 to the position of FIG. 7.

Mounted alongside the latch bolt 115 between the latch bolt and the side 111 of the latch frame, for reciprocation within the latch frame, is a slide member 150 formed, at its upper end, with a camming face 153 which slopes at a proper angle for cooperative engagement with the strike 31 as the door on which the latch mechanism is mounted moves to closed position. The mounting for vertical reciprocation is accomplished by means of a vertical slot 151 in the slide 150 through which passes the pin 116 upon which the latch bolt 115 is pivotally mounted. A spring 152 is received within an elongated vertical slot 154 in the slide 150 and acts against an abutment 156 punched out of the side 111 and against the upper surface of the slot 154 so as to resiliently urge the slide 150 toward an upward position, the upward movement of the slide being limited by the lower surface of the slot 151 engaging the pin 116.

The function of the slide 150 is to hold the latch bolt 115 in a retracted position, as shown in FIG. 9, or in a partially retracted position and to release the latch bolt for movement to projecting position when the camming surface of the slide is engaged by the strike 31 to force the slide downwardly as in FIGS. 6-8. The slide is formed with a laterally projecting member 161 which has, facing the latch bolt, a surface 160 which is generally flat but has a slight protuberance 162 at its upper end. The latch bolt 115 has a generally flat surface 161, arranged to be perpendicular to a radius extending from the axis of the pin 116, for cooperative engagement with the surface 160 of the slide. The surface 160 is arranged at such an angle with the vertical, approximately 55°, and the protuberance 162 extends a sufficient distance beyond the plane of the surface 160 that whenever any part of the surface 161 is moved to engagement with the surface 160, the latch bolt 115 will be held in a partially or fully retracted position by the protuberance 162 and/or the surface 160. As can be seen in FIG. 9, when the latch bolt is retracted to the position of FIG. 9, the surface 160 is also perpendicular to a radius extending from the axis of the pivotal mounting pin 116 of the latch bolt 115.

Assuming for the moment that a relatively great force is exerted on the door itself in the direction of door-opening movement, it is only necessary that sufficient force be exerted upon the panic bar 23′ to lower the actuator 120 with respect to the link 131 and with respect to the latch bolt 115 a sufficient distance that the upper end 145 of the actuator 120 is out of the path of the abutment surface 142. When the parts are so arranged it is not necessary that the actuator be moved further by actuation of the panic bar because the latch bolt will be at least partially retracted by the movement of the latch bolt past the strike 31 as the door opens. The strike extends a sufficient distance downwardly from the door frame that the wiping of the latch bolt against the strike, while the slide 150 rises under the influence of the spring 152 as the latch assembly moves past from the strike 31, causes engagement of the surfaces 160 and 161 resulting in the latch bolt being held by the slide in the position to which it is forced by the strike 31. If the latch bolt is positioned in such a manner it can be seen that it will be retracted at least to a position wherein the door may be closed and the latch bolt again moved past the strike without the latch bolt engaging the strike to prevent closing of the door. During such closing, the strike will engage the sloping camming surface 153 of the slide so as to force the slide downwardly in the latch frame and to separate the surfaces 160 and 161 so as to release the latch bolt 115 and to allow it to be projected toward the position of FIGS. 6–8 by means of the spring 130. As described above, the compression spring 60 in the center case 25 will be acting through the upper rod actuator 55 and the upper rod 27 to urge the actuator upwardly from the position of FIG. 9 or from any intermediate position between the positions of FIGS. 6 and 9 so as to allow the spring 130 to expand and to project the latch bolt.

It should be noted that, should some object in the path of the latch bolt 115 interfere with its projection by the spring 130, the upper end 145 of the actuator is so shaped and a sloping surface 165 of the latch bolt is so shaped that the actuator, moving upwardly with relation to the link 131, can engage the sloping surface to forcibly move the latch bolt to its projected position.

Figure 12:
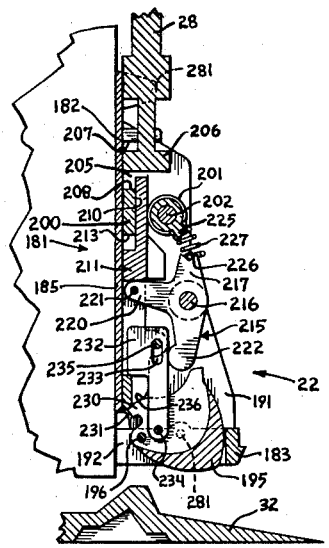
FIG. 12 is a section similar to FIG. 11 but showing the lower latch mechanism with its latch bolt in a retracted, door-releasing position.
Figure 10:
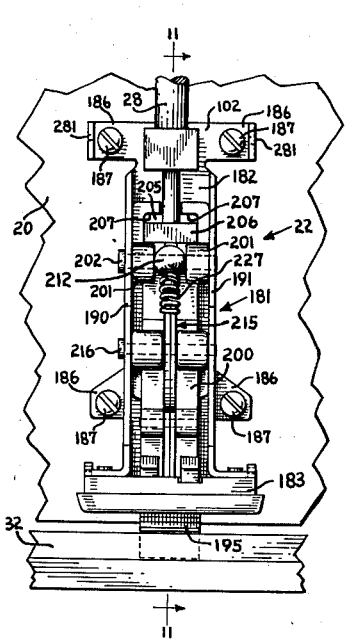
FIG. 10 is an enlarged elevation of a lower latch mechanism forming a portion of the panic exit device of FIG. 1, the lower latch mechanism being shown with its cover removed and in door-retaining association with the threshold.
Figure 11:
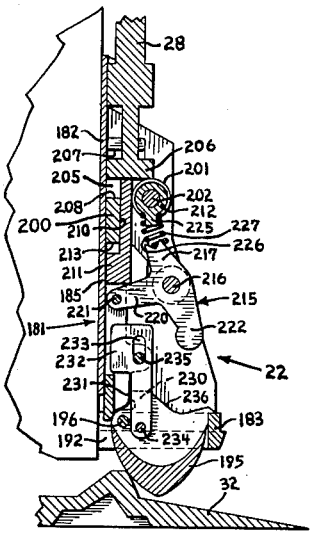
FIG. 11 is a section taken along the line 11—11 of FIG. 10 in the direction of the arrows.

Referring now to FIGS. 10–12, the lower latch mechanism 22 is shown with its housing 180 (FIG. 1) removed and comprises a lower latch frame, indicated generally by the numeral 181, which is formed in two portions, an upper portion 182 and a lower portion 183 which are fixed to one another. The upper portion 182 is formed with a base wall 185 having laterally extending ears 186—186, formed in the plane of the base wall, said ears being suitably apertured for reception of a plurality of screws 187—187 for fixing the lower latch frame 181 to the surface of the door. The upper portion 182 of the frame is formed with parallel side walls 190 and 191 projecting outwardly from the base wall 185 and is open at its upper and lower ends, the lower portion 183 of the frame having a cut-out portion 192 so as to provide an open lower end for the lower latch frame 181.

A lower latch bolt 195 is pivotally mounted upon the latch frame 181 near the lower end thereof adjacent the base wall 185 by means of a pin 196 received within suitable bores within the lower portion 183 of the latch frame. The latch bolt 195 is pivotal toward the door into a position, as shown in FIGS. 10 and 11, wherein the bolt projects from the lower end of the latch frame and is pivotal away from the door into a position, as shown in FIG. 12, wherein the bolt is retracted within the latch frame. As can perhaps best be seen in FIG. 11, the further projection of the latch bolt 195 past the position of FIG. 11 is limited by the engagement of the latch bolt with the lower portion 183 of the latch frame 181.

A lower latch bolt actuator 200 is retained for vertical reciprocation between the side walls 190 and 191 of the latch frame by means of a pair of rollers 201—201 rotatably received upon a mounting pin 202 which is received within suitable apertures in the side walls 190 and 191 of the latch frame. The actuator 200 has a cavity 205 at its upper end within which is received a head 206 of the lower rod 28, the cavity having upper surfaces 207 and a lower surface 208 which are spaced apart a substantially greater distance than the thickness of the head 206. The actuator 200 has an elongated recess 210 centrally thereof which opens into the cavity 205 and which has received therein an L-shaped member 211 in such a manner that the upper end of the L-shaped member extends upwardly past the lower surface 208 of the cavity 205. The L-shaped member 211 is retained for vertical reciprocation within the elongated recess 210 by means of an actuator arm 220 forming a part of a lever, indicated generally by the numeral 215, and by a ball shaped toggle member 212 pivotally mounted upon the pin 202 between the rollers 201, the vertical movement of the L-shaped member being limited by an abutment surface 213 of the actuator 200 and by the actuator arm 220.

The lever 215 is pivotally mounted upon a pin 216 received in suitable apertures in the side walls 190 and 191 of the lower latch frame and includes a toggle arm 217 which projects generally toward the toggle member 212, the actuator arm 220 which is pivotally secured to the actuator 200 by means of a pin 221, and a limit arm 222 which extends generally downwardly. The toggle member 212 has a radially projecting nipple 225 and the toggle arm 217 has an indentation 226 for reception of a compression spring 227, the compression spring 227 being received upon the nipple 225 and within the indentation 226 so as to provide a toggle arrangement tending to urge the actuator 200 either downwardly or upwardly depending upon the position of the actuator 200.

A portion 230 of the latch bolt 195 having an abutment surface 231 is so arranged as to move toward the base wall 185 of the latch frame when the latch bolt moves from the projected position of FIG. 11 toward the retracted position of FIG. 12. The actuator 200 is connected to the lower latch bolt 195 by means of a link 232 which has a vertical slot 233 therein through which passes a pin 235 which is received within suitable apertures within the actuator 200. The link 232 is pivotally secured to the latch bolt 195 by a pin 234 at a point on the other side of the pin 196 in relation to the base wall 185 whereby, when the link is moved upwardly by the actuator 200, the latch bolt 195 is moved toward the retracted position illustrated in FIG. 12.

When the actuator moves downwardly from the position of FIG. 12 the latch bolt 195 is allowed to pivot from the position of FIG. 12 toward the position of FIG. 11. In some situations where there is no dust, dirt or other material interfering with the projection of the lower latch bolt, the force of gravity would probably be sufficient to cause projection of the latch bolt into the position of FIG. 11. However, because dirt or other material frequently interferes with such projection, the lower end of the actuator is so shaped and the sloping surface 236 of the latch bolt is so shaped that the actuator, moving downwardly with relation to the link 232, can engage the sloping surface to forcibly move the latch bolt to its projected position. After the lower latch bolt moves into the projecting position of FIG. 11, the actuator 200 is then free to continue its downward movement because of the pin-and-slot connection with the link 232 until the lower end of the actuator 200 is positioned between the base wall 185 and the abutment surface 231 of the lower latch bolt 195 so as to block the lower latch bolt in the projected position of FIGS. 10 and 11.

The function of the L-shaped member 211 is to raise, with respect to the actuator 200, the effective lower surface of the socket 205 upon which the head 206 acts when the actuator 200 moves downwardly and to lower, with respect to the actuator 200, the effective lower surface of said socket upon which the head 206 acts when the actuator 200 moves upwardly. As can be seen in FIG. 11, when the lower latch bolt is projected and the actuator 200 is in its lowermost position, the actuator arm 220 of the lever 215 is at such an angle that the L-shaped member is held upwardly with respect to the actuator toward abutment surface 213. As can be seen in FIG. 12, when the lower latch bolt is retracted and the actuator 200 is in an upward position, the L-shaped member is allowed to move downwardly with relation to the actuator so that its upper end does not extend as far above the lower surface 208 of the cavity 205 as it does in the position of FIG. 11. Thus, assuming the rod head 206 to be in engagement with the L-shaped member, a given movement of the rod 28 is accompanied by a somewhat greater movement of the actuator 200.

Assuming now that the lower latch mechanism is in the position of FIG. 11 and the lower rod 28 is moved upwardly, the actuator 200 remains stationary until the head 206 engages the upper surfaces 207—207 of the cavity 205. At this time, the actuator 200 begins to move upwardly with relation to the link 232 and the latch bolt 195 which movement continues until the actuator has moved out of the path of the abutment surface 231.

If a relatively great force is being exerted upon the door in the direction of door-opening movement, the door will now be free to open causing the latch bolt 195 to be pivoted by the threshold plate 32 until the link 232 is moved upwardly a sufficient distance that the lower surface of the slot 233 engages the pin 235 so as to move the actuator upwardly. A very slight such further movement of the actuator is sufficient to move the toggle arm 217 to a position in which it projects toward the rightward side of the toggle member 212 (as viewed in FIG. 12) causing the compression spring 227 to act through the lever 217 to rapidly raise the actuator 200 into the position of FIG. 12. The lower latch mechanism is prevented from further movement past the position of FIG. 12 by means of the limit arm 222 engaging the link 232.

If instead of a relatively great force being exerted on the door itself in the direction of door-opening movement there is only a force being exerted upon the panic bar 23' so as to raise the lower rod 28 upwardly, the actuator 200 will move upwardly under the urging of the lower rod until the toggle arm 217 moves into a position in which it is projecting toward the rightward side of the toggle member at which time the toggle arrangement will, in the manner explained above, rapidly move the actuator 200, link 232 and lower latch bolt to the retracted position of FIG. 12.

From the above description, it will be apparent that the rod actuator 55, the rod 27, the bolt actuator 120 and the link 131 constitute retractor means for the latch bolt 115; while the rod actuator 56, the rod 28, the bolt actuator 200 and the link 232 constitute retractor means for the latch bolt 195.

Figure 13:
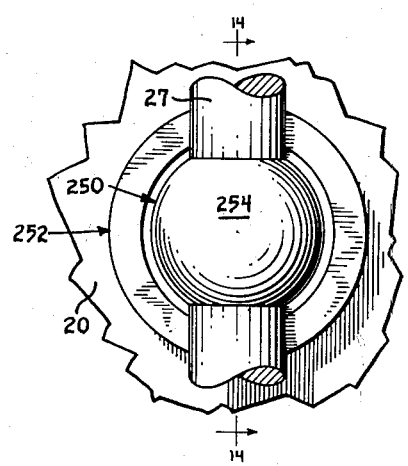
FIG. 13 is an enlarged fragmentary elevation of a rod, a rod guide means and associated means for attaching the rod guide means to a door, all of which forms a portion of the panic exit device depicted in FIG. 1.
Figure 14:
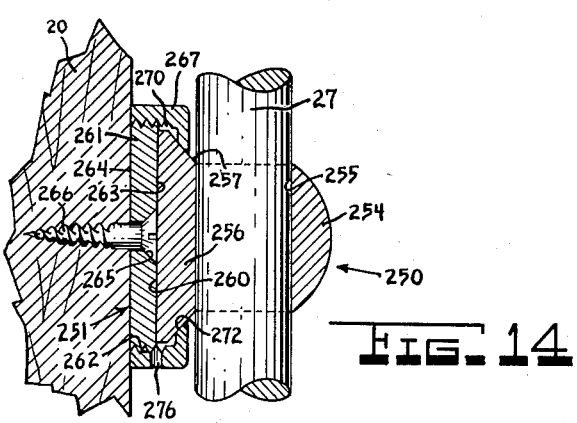
FIG. 14 is a section taken along the line 14—14 of FIG. 13.

FIGS. 13 and 14 show the details of a representative one of rod guides 250—251 and associated means 252—253 for attaching the rod guides to the door, the rod guides 250 and 251 being illustrated in FIGS. 1 and 2 as attached to the door between the upper latch mechanism 21 and the center case 25 and between the lower latch mechanism 22 and the center case 25, respectively, where they slidably receive rods 27 and 28 for vertical reciprocation. The rod guide 250 illustrated in FIGS. 13 and 14 comprises a part-spherical portion 254 having a cylindrical aperture 255 therethrough and an enlarged base portion 256 provided with a frusto-conical surface 257 and a flattened surface 260 facing away from the rod guide portion or parts-pherical portion 254.

A cylinder 261 which has a relatively small axial dimension as compared to its diametral dimension is provided with an externally threaded cylindrical surface 262 and with two flat ends 263 and 264. A suitably countersunk bore 265 is formed axially through the cylinder 261 for the reception of a flat headed screw 266 for securely attaching the cylinder 261 to the surface of the door with its flat end 264 abutting the door. A cap 267 has an interiorly threaded cylindrical cavity 270 therein which is open at one end for threaded reception upon the externally threaded cylindrical surface 262. The cap 267 is provided with an aperture 272 which extends from the other end of the cylindrical cavity through the cap in a frusto-conical manner for mating engagement with the frusto-conical surface 257 of the base portion 256.

The part-spherical portion 254 of the rod guide 250 is somewhat smaller than the aperture 272 and the enlarged base portion 256 is somewhat larger than the aperture 272 whereby the rod guide may be passed through the aperture 272 in such a manner that the base is retained within the cylindrical cavity 270. The rod is then passed through the cylindrical aperture 255 in the part-spherical portion 254 of the rod guide 250 and the cap 267 is screwed down upon the cylinder 261 to fixedly mount the rod guide with relation to the door.

The dimension of the cap 267 axially of the cylindrical cavity 270 is sufficiently great to cover the cylinder 261, when the cap is so screwed down, but is sufficiently small to provide a secure attachment of the base portion 256. Because of the frusto-conical mating surfaces 257 and 272 the rod guide, when so attached to the door, appears to be integral with the cap 267. It should be noted that when the rod guide is so attached to the door there is no attachment means visible on either side of the door thus providing an aesthetically pleasing appearance and an appearance misleading to one desiring to tamper with the panic exit device. To aid in the screwing down of the cap 267 a small aperture such as the aperture 276 may be provided in the side wall of the cap so that the cap can be easily tightened down by inserting a nail in the cap for better grip and greater leverage. Of course, any suitable means such as a spanner wrench, etc. may be designed for tightening down the cap.

The housings 100 and 180 may be attached to their respective latch frames 101 and 181 after attachment of the latch frames to the door by screws 280—280 (FIGS. 1 and 2) passing through the housing walls and into threaded bores 281—281 in the upper and lower latch frames.

Each of rods 27 and 28 is constructed, in part, of two portions 285 and 286, 287 and 288, the portions 286 and 288 being internally threaded for threaded reception of the portions 285 and 287. By rotating the portion 285 or 287 with respect to the portion 286 or 288, respectively, the effective operating length of the rods can be changed. In attaching the panic exit device to the door the rod lengths should so be set that, when the center case mechanism is in the position of FIG. 4, the rod heads 126 and 206 are in the positions illustrated in FIGS. 6, 7 and 8 and FIGS. 10 and 11, respectively, with the other portions of the latch mechanisms positioned as in those figures.

As indicated above with respect to the individual latch mechanisms a door equipped with our complete panic exit device may be opened by a relatively slight pressure upon the panic bar even though there is a relatively great force acting on the door in the direction of door-opening movement. The lost-motion between the lower rod actuator 56 and the actuator lever 67 is approximately equal to the lost-motion between the actuator 200 and the lower rod 28 so that, when the panic bar 23' is depressed, the upper rod actuator, upper rod and upper latch bolt actuator do not begin to move downwardly until the lower latch bolt actuator begins to move upwardly. Thus, the upper and lower latch bolts are unblocked simultaneously which, for various obvious reasons, is more desirable than unblocking one latch bolt ahead of the other.

Assuming that the latch bolts are so unblocked the door is free to be opened by pressure on the door itself in the direction of door-opening movement or by further depression of the panic bar 23'. In either case the upper latch bolt 115 will be moved to a partially retracted position or to a completely retracted position as in FIG. 9 and will be held in that position by the slide 150 which will be forced upwardly by the spring 152 causing the protuberance 162 and/or surface 160 to engage the surface 161 and to hold the upper latch bolt in the position to which it has been retracted. Whether the door is opened by pressure on the door itself or by pressure on the panic bar 23' only, the latch bolt 195 will be completely retracted by the toggle action of the spring 227 to the position of FIG. 12 as above described. Since the upper latch bolt, latch bolt actuator, rod and rod actuator are positively connected to one another, they will all be held downwardly as will be the arm 71 of the lever 67. The lower rod actuator 56 and rod 28 will be held upwardly by the arm 72 of the lever 67 so that the rod head 206 will be positioned as in FIG. 12. Thus, the lower latch bolt 195 will be allowed to remain in the retracted position of FIG. 12 until the door is again closed.

When the door is moved toward its closed position the latch bolts 115 and 195 wil move past the strike 31 and the threshold plate 32 so as to allow the door to be closed because they will remain in the positions to which they have been retracted as above described. After the latch bolts have passed the strike 31 and threshold 32, the camming surface 153 of the slide 150 will be engaged by the strike to depress the slide and to allow projection of the latch bolt 115 by the spring 130 (acting through link 131 as above described) and the spring 60 (acting through the upper rod actuator 55 and upper rod 27 to raise the latch bolt actuator 120).

Simultaneously with the upward movement of the rod actuator 55, the lever 67 pivots in a clockwise direction allowing the spring 60 to move the lower rod actuator 56 and lower rod 28 downwardly causing the lower rod head 206 to move downwardly from the position of FIG. 12 and to engage the upper end of the L-shaped member 211. As the rod head continues its downward movement, the rod head, acting through L-shaped member, the actuator arm 220 of the lever 215, and the pin 221 moves the actuator to a position in which the toggle arm 217 projects toward the leftward side of the toggle member 212 (as viewed in FIG. 12) so that the force of the toggle spring 227 as well as the force of the spring 60 in the center case is acting upon the actuator 200 to cause it to force the lower latch bolt into projected position and to move the actuator into blocking position between the lower latch bolt and the base wall 185 of the lower latch frame.

Conceivably a solid, non-yielding piece of material may be located on the threshold plate 32 in the path of the lower latch bolt, so that even the force of the two springs 60 and 227 is insufficient to project the lower latch bolt. It is also possible that the spring 227 will not have the opportunity to act to force the actuator downwardly because the dimensions of the solid, non-yielding piece of material are so great as to prevent lowering of the actuator to a point where the spring 227 can so act. In such a situation it is very desirable that the projection and blocking of the upper latch bolt not be prevented. The lost-motion between the arm 72 of the lever 67 and the lower rod actuator 56 as well as the operation of the L-shaped member 211 allows the lower latch bolt to be held in a completely retracted position without interfering with the projection of the upper latch bolt. The operation of the L-shaped member which has been explained above, is such that when the lower bolt actuator 200 is held upwardly a given distance from the fully downward position of FIG. 11, the L-shaped member is not held as great a distance upwardly and therefore the lower rod 28 is also not held as far upwardly. This fact plus the fact that the lower rod actuator 56 can be moved upwardly to the extent of the lost motion between the parts 72 and 56 without corresponding downward movement of the rod actuator 55 allows the projection and blocking of the upper latch bolt to occur unhindered.

We claim as our invention:

1. A safety panic exit device for a door comprising an upper latch mechanism adapted to be mounted on a door near the top thereof and including an upper latch bolt, a lower latch mechanism adapted to be mounted on a door near the bottom thereof and including a lower latch bolt, a case adapted to be mounted on the door intermediate of said latch mechanisms, a panic bar, a panic bar lever pivotally mounting said panic bar on said case, an upper rod operatively connected to project said upper latch bolt upon upward movement of said upper rod and retract said upper latch bolt upon downward movement of said upper rod, a lower rod operatively connected to project said lower latch bolt upon downward movement of said lower rod and retract said lower latch bolt upon upward movement of said lower rod, an upper rod actuator fixed to said upper rod and received for vertical reciprocation within said case, a lower rod actuator fixed to said lower rod and received for vertical reciprocation within said case, a compression spring received between mutually facing abutment surfaces on said upper and lower rod actuators so as to urge said upper rod actuator upwardly and said lower rod actuator downwardly, said panic bar lever extending into said case to a position engaging said lower rod actuator whereby, when said panic bar is actuated, said lower rod actuator is moved upwardly against the urging of said compression spring, each of said rod actuators being formed with a cavity, said cavities being laterally offset with respect to each other and opening toward one another, and an actuator lever including two oppositely projecting, generally horizontal arms, each of said arms having a portion which is received within one of said cavities, said actuator lever being mounted to oscillate with relation to said case about an axis midway between the distal ends of said arms, the cavity-received portion of one of said projecting arms being substantially smaller than the cavity within which it is received whereby said lower latch bolt, rod, and rod actuator may be held upwardly without causing said upper latch bolt, rod, or rod actuator to be held downwardly.

2. A safety panic exit device for a door comprising an upper latch mechanism adapted to be mounted on a door near the top thereof, an upper latch bolt operatively associated with said upper latch mechanism, a lower latch mechanism adapted to be mounted on a door near the bottom thereof, a lower latch bolt operatively associated with said lower latch mechanism, a case adapted to be mounted on the door intermediate of said latch mechanisms, a panic bar, a panic bar lever pivotally mounting said panic bar on said case, an upper rod operatively connected to said upper latch mechanism in such a manner that, when said upper rod moves upwardly, said upper latch bolt is projected and, when said upper rod moves downwardly, said upper latch bolt is retracted, a lower rod operatively connected to said lower latch mechanism in such a manner that, when said lower rod moves downwardly, said lower latch bolt is projected and, when said lower rod moves upwardly, said lower latch bolt is retracted, an upper rod actuator fixed to said upper rod and received for vertical reciprocation within said case, a lower rod actuator fixed to said lower rod and received for vertical reciprocation within said case, a compression spring received between mutually facing abutment surfaces on said upper and lower rod actuators so as to urge said upper rod actuator upwardly and said lower rod actuator downwardly, said panic bar lever extending into said case to a position engaging said lower rod actuator whereby, when said panic bar is actuated, said lower rod actuator is moved upwardly against the urging of said compression spring, each of said rod actuators being formed with a part-cylindrical cavity, said cavities being laterally spaced and opening toward one another, and an actuator lever mounted for oscillation within said case, said actuator lever being formed with two equally, oppositely projecting, generally horizontal arms each having its distal end received within one of said cavities, the arm end which is received within the cavity of said upper rod actuator being of the same cylindrical shape as the cavity within which it is received and the arm end which is received within the cavity of said lower rod actuator being of a part-cylindrical shape with its downwardly facing surface flattened whereby, when said lower actuator is moved upwardly by actuation of said panic bar, the total upward movement of said lower rod actuator is substantially equal to the total downward movement of said upper rod actuator even though lost mention caused by the part-cylindrical shape of said last-named arm end initially allows movement of said lower rod actuator without corresponding movement of said upper rod actuator.

3. A safety panic exit device for a door comprising a pair of latch mechanisms, each including a latch bolt movable between projected, door-retaining position and retracted, door-releasing position, means for mounting one of said mechanisms near the top of a door with its latch bolt projectible upwardly, means for mounting the other of said mechanisms near the bottom of such a door with its latch bolt projectible downwardly, said other mechanism including spring toggle means effective to urge the latch bolt of said other mechanism selectively from an intermediate position to fully projected position or to fully retracted position, a case, means for mounting said case on a door between the positions of said latch mechanisms, panic bar means including a lever pivotally supported from said case and having a portion disposed within said case, retractor means for the latch bolt of said one mechanism including an element reciprocably supported within said case and means operatively connecting said element with the latch bolt of said one mechanism, retractor means for the latch bolt of said other mechanism including an element reciprocably supported within said case and laterally offset from said first-named element and lost-motion means operatively connecting said last-named element with the latch bolt of said other mechanism, said lever portion operatively engaging said last-named element, means within said case providing an operative connection between said elements to enforce equal and opposite movement of the other of said elements upon full actuation of said one element by said lever, but having a lost-motion connection with said one element substantially equal in magnitude to the lost motion in said means connecting said one element with its latch bolt, and spring means resiliently resisting latch bolt-retracting movement of said retractor means.

4. A safety panic exit device for a door comprising an upper latch mechanism adapted to be mounted near the top of that surface of a door which faces away from the direction of door-opening movement, an upper latch bolt pivotally mounted upon said upper latch mechanism in such a manner as to pivot away from the door when moving from a projected to a retracted position, an upper bolt actuator mounted for vertical reciprocation within said upper latch mechanism, said upper bolt actuator being operatively connected to said upper latch bolt in such a manner that, when said upper bolt actuator is moved upwardly, said upper latch bolt is projected and, when said upper bolt actuator is moved downwardly, said upper latch bolt is retracted, said upper bolt actuator being constructed so as to block said upper latch bolt in projected position when said upper bolt actuator is in a most upward position, a lower latch mechanism adapted to be mounted on the same surface of such a door near the bottom thereof, a lower latch bolt pivotally mounted upon said lower latch mechanism in such a manner as to pivot away from the door in moving from a projected to a retracted position, a lower bolt actuator element mounted for vertical reciprocation within said lower latch mechanism, said lower bolt actuator being operatively connected to said lower latch bolt in such a manner that, when said lower bolt actuator is moved downwardly, said lower latch bolt is projected and, when said lower bolt actuator is moved upwardly, said lower latch bolt is retracted, said lower bolt actuator being constructed so as to block said lower bolt in projected position when said lower bolt actuator is in a most downward position, an upper rod positively connected to said upper bolt actuator for vertical reciprocation therewith, a lower rod element, one of said elements being formed with a pair of surfaces and the other of said elements being formed with a portion loosely received between said surfaces whereby to provide a positive, lost-motion connection for vertical reciprocation between said lower rod and said lower bolt actuator, a case adapted to be mounted on the same surface of such a door intermediate of said latch mechanisms, an upper rod actuator fixed to said upper rod and received for vertical reciprocation within said case, a lower rod actuator fixed to said lower rod and received for vertical reciprocation within said case, a compression spring received between mutually facing abutment surfaces on said upper and lower rod actuators so as to urge said upper rod actuator upwardly and said lower rod actuator downwardly, a panic bar, a panic bar lever pivotally mounting said panic bar on said case, said panic bar lever extending into said case to a position engaging said lower rod actuator whereby, when said panic bar is actuated, said lower rod actuator is moved upwardly against the urging of said compression spring, each of said rod actuators being formed with a cavity, said cavities being laterally spaced and opening toward one another, and an actuator lever pivotally supported within said case and including two equally, oppositely projecting, generally horizontal arms each of which has a distal end portion received within one of said cavities, the end portion of one of said projecting arms being substantially smaller than the cavity within which it is received whereby, when said lower rod is moved upwardly, said upper rod actuator does not begin to move downwardly until the lost motion caused by the relative smallness of said one projecting arm portion is taken up, the lost motion between said actuator lever and rod actuator being substantially equal to the lost motion between said lower rod and lower bolt actuator whereby, when said panic bar is actuated, said lower and upper bolt actuators are moved to unblock their respective latch bolts simultaneously.

References Cited in the file of this patent
UNITED STATES PATENTS

| | | |
|---|---|---|
| 1,469,590 | Palmer | Oct. 2, 1923 |
| 1,518,187 | Dyer | Dec. 9, 1924 |
| 1,529,865 | Bolles | Mar. 17, 1925 |
| 1,630,141 | Soemer | May 24, 1927 |
| 1,721,489 | Prinzler | July 16, 1929 |
| 2,017,322 | Moore | Oct. 15, 1935 |
| 2,606,794 | Perkins | Aug. 12, 1952 |
| 2,726,890 | Teetor | Dec. 13, 1955 |
| 2,893,773 | Clifton | July 7, 1959 |
| 2,908,523 | Foster | Oct. 13, 1959 |